United States Patent

Gaw, Jr.

[11] Patent Number: 5,536,125
[45] Date of Patent: Jul. 16, 1996

[54] SLIDING TWO-PIECE FASTENER

[75] Inventor: William D. Gaw, Jr., Royal Oak, Mich.

[73] Assignee: Ford Motor Company, Dearborn, Mich.

[21] Appl. No.: 364,335

[22] Filed: Dec. 27, 1994

[51] Int. Cl.⁶ .............................. F16B 37/04; F16B 39/284
[52] U.S. Cl. .................. 411/182; 411/112; 411/432; 411/908
[58] Field of Search ............................ 411/108, 111, 411/112, 182, 432, 908

[56] References Cited

U.S. PATENT DOCUMENTS

| Re. 17,870 | 11/1930 | Carr . | |
|---|---|---|---|
| 3,217,772 | 11/1965 | Adams | 441/112 |
| 3,646,982 | 3/1972 | Cushman | 411/108 X |
| 3,875,661 | 4/1975 | Lidstrom et al. . | |
| 4,529,244 | 7/1985 | Zaydel . | |
| 4,564,232 | 1/1986 | Fujimori et al. . | |
| 4,573,733 | 3/1986 | Zaydel . | |
| 4,707,020 | 11/1987 | Enokida et al. . | |
| 4,923,347 | 5/1990 | Moryl et al. . | |
| 4,973,102 | 11/1990 | Bien . | |
| 5,028,189 | 7/1991 | Harley . | |
| 5,046,904 | 9/1991 | Malinow | 411/182 X |
| 5,098,765 | 3/1992 | Bien . | |
| 5,129,768 | 7/1992 | Hoyle et al. | 411/182 |
| 5,228,742 | 7/1993 | Johnson et al. . | |

Primary Examiner—Neill R. Wilson
Attorney, Agent, or Firm—Daniel M. Stock; Robert L. May

[57] ABSTRACT

A fastening assembly for securing plastic panels (50) to metallic substrates (52) is provided in which a metallic nut (14) is mounted in snap-fit relationship on plastic insert (12), which is in turn engaged in snap-fit relationship on the metallic substrate (52). The nut (14) slidably engages the plastic insert (12) to permit certain movement along an axis perpendicular to the axis of the insert (12) to provide thermal compensation for the mounted plastic panel (50). The nut (14) itself utilizes the same guide lug structure (26) of the insert member (12) to both effect snap-fit retention of the nut (14) on the insert (12) and to guide the sliding movement of the nut (14) with respect to the insert (12).

15 Claims, 1 Drawing Sheet

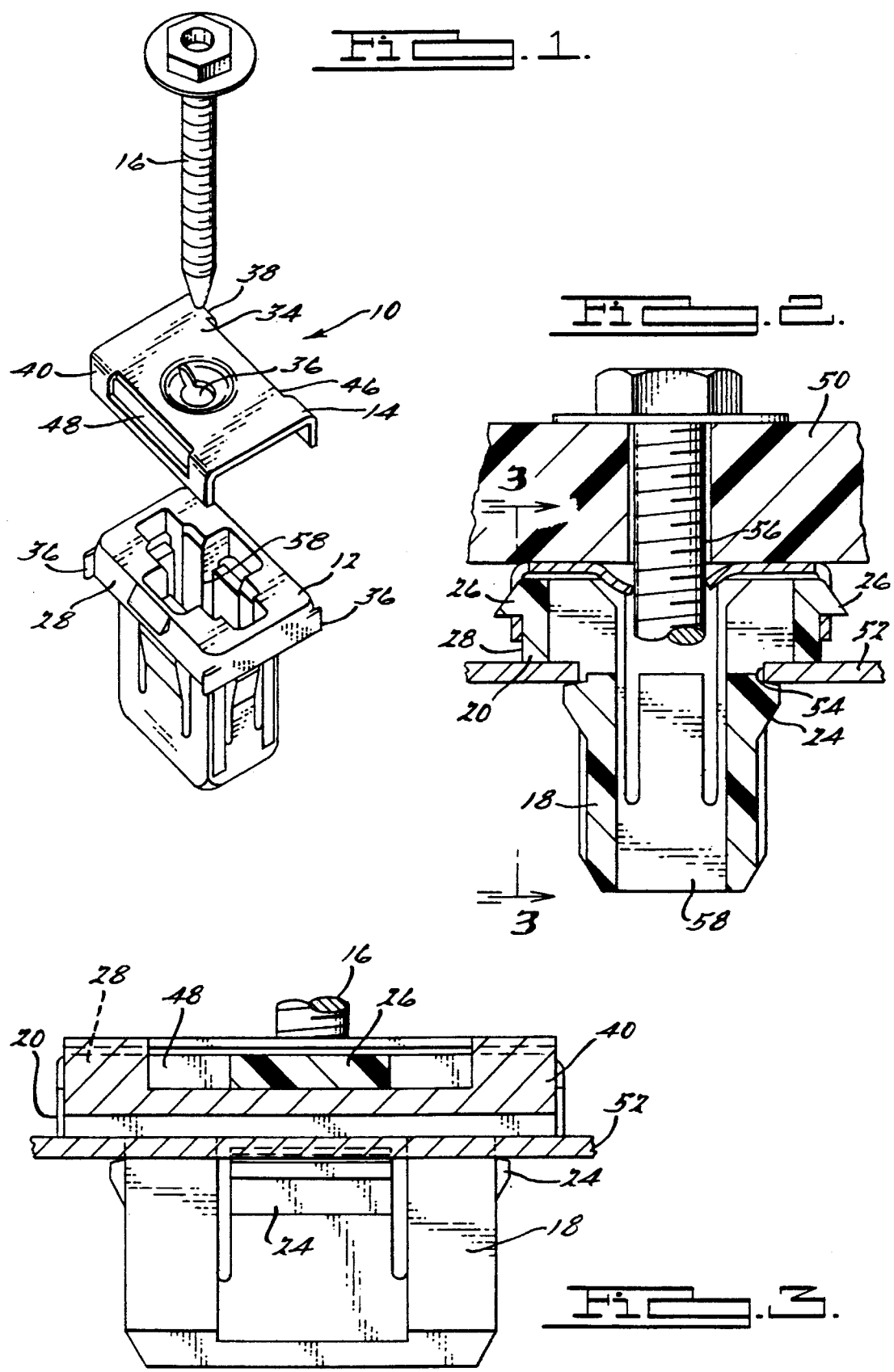

SLIDING TWO-PIECE FASTENER

BACKGROUND OF THE INVENTION

1. Field of the Invention

The present invention relates generally to automotive fastener assemblies, and more specifically to fastener assemblies for securing plastic finish panels to metallic substrates.

2. Description of the Related Art

As part of the overall effort of automotive manufacturers to improve fuel economy of automotive vehicles, plastic finish panels have come into widespread use; even broader use is planned for the future. Most of the uses of plastic finish panels in the automotive vehicle arts require that a plastic sheet or panel be secured to an underlying metallic substrate through suitable fasteners. As in most mechanical joining applications, one of the primary fastening systems of choice is the use of a threaded fastener spanning the two components to be secured together and exerting a clamping load between them. In the target application for the automotive industry, the mounting of a plastic body panel on a metallic substrate such as a frame or underbody, certain impediments to the presentation of a finish panel of good quality and appearance have been experienced. The significant difference in coefficient of thermal expansion between the plastic panel and the metallic substrate tends to result in displacement between these two components, and when a fastener is arranged to hold the panel fast with respect to the substrate, distortion can result.

The automotive industry has addressed this problem by providing fastener mechanisms which permit some relative movement between the panel and the substrate. U.S. Pat. No. 5,098,765 to Bien is exemplary of solutions suggested in the industry, providing mounting blocks engageable in the substrate to permit fore and aft movement which mounts a fastener receiving plate through agency of laterally extending wings. This and other solutions have been found to be disadvantageously complex and expensive to produce and also fail to directly provide for movement of a fastener receiving device or nut in response to thermal growth of the plastic panel. This direct compensation for thermal growth is, at least in some applications, the most reliable way to provide for the desired compensating movement.

SUMMARY OF THE INVENTION

The disadvantages of the prior art are overcome in a fastening assembly according to the present invention for securing a plastic finish panel to a metallic substrate that includes a plastic insert received in snap-fit relationship in an aperture formed in the substrate and a metallic nut member carried in axially fixed relationship on the plastic insert member and including portions of the metallic member and the plastic insert member operative to permit the predetermined amount of movement of the nut in two opposed directions for effecting compensation for thermal growth of the plastic panel relative to the metallic substrate.

It is one advantage of the fastener assembly of the present invention that compensating movement of a metallic fastener receiving nut is directly effected independent of the position of the plastic insert member.

BRIEF DESCRIPTION OF THE DRAWINGS

Other objects, features, and advantages of the fastener assembly according to the present invention will be apparent to those skilled in the automotive fastener arts upon reading the following description with reference to the accompanying drawings, in which:

FIG. 1 is an exploded perspective view of the fastener assembly according to the present invention;

FIG. 2 is a cross-sectional view of the fastener assembly according to the present invention illustrating the fixed securement of a plastic finish panel to a metallic substrate; and FIG. 3 is a cross-sectional view taken along line 3—3 of FIG. 2.

DESCRIPTION OF THE PREFERRED EMBODIMENT(S)

Turning now to FIG. 1, a fastener assembly 10 according to the present invention is illustrated as generally including an insert member 12, a nut member 14, and an externally threaded fastener such as a screw 16.

As may best be seen in FIG. 2, the insert member 12 is preferably a plastic molded part of generally T-shaped cross-section. It includes a lower plug portion 18 of generally box-like configuration and an upper nut mounting portion 20, likewise of generally box-like configuration, of larger cross-section than the plug portion 18. As used herein, the terms upper and lower, inner and outer, and other terms of direction, will be as illustrated in this FIG. 2. An annular face 22 is formed on the underside of the nut mounting portion 20 and a plurality (four shown) of barbs 24 are formed integrally with plug portion 18 on its outer peripheral surfaces in spaced relationship with respect to the annular face 22 measured along the longitudinal extent of the plug portion 18. The plug portion 18 is referred to as defining a longitudinal axis notwithstanding its box-like rectangular configuration, its downwardly extending axis of symmetry being inferred.

The nut mounting portion 22 also has a plurality (two shown) of generally triangular projections or barbs 26 projecting from two slide surfaces 28, 30 formed on the longer sides of the nut mounting portion 20, as viewed in FIG. 1. Centering tabs indicated generally at 30, 32 in FIG. 1 project perpendicularly from the ends of the slide surfaces 28, 30 to assist in locating the nut 16 with respect to the insert 12.

The nut 14 is preferably formed as a generally C-shaped member having a base portion 34 having a dished, internally threaded aperture 36 formed through it and terminating at laterally spaced, downwardly projecting slide arms 38, 40. The nut 14 is fabricated as a metallic member and includes longitudinally extending slots 46, 48 formed through the slide arms 38, 40, respectively.

Turning next to FIG. 2, the fixed securement of a plastic finish panel 50 to a metallic substrate 52 through agency of the invention fastening assembly 10 is illustrated. The insert member 12 is inserted through an aperture 54 formed in the metallic substrate 52 and the barbs 24 slide through the aperture 54 and snap back to retain the insert 12 in snap-fit retention with respect to the metallic substrate 52.

The nut 14 is likewise presented to the nut mounting portion 20 of the insert 12, and by agency of the projections 26 cooperating with the guide slots 46, 48, snap-fit retention in the axial direction of the nut 14 with respect to the insert 12 is effected. The screw 16 may then be introduced through a clearance hole 56 provided in the finish panel 50 to engage the threaded aperture 36 in the nut 14 and clampingly secure the finish panel 50 with respect to the metallic substrate 52.

If thermal growth of the plastic panel 50 is experienced in a direction parallel to the slots 46, 48, the screw 16 can be carried along with the deflecting panel 50 and can be permitted to move the nut 14 a limited amount in the direction of the slots 46, 48 until the projection 26 contacts either end of the slots 46, 48.

It will be noted that a hollow cavity 58 is formed in the insert 12 for receiving a portion of the nut 16 being sized to permit the certain movement described.

Only one embodiment of the fastening assembly of the present invention has been described. Others may occur to those skilled in the automotive fastening arts which do not depart from the scope of the following claims.

What is claimed is:

1. A fastening assembly for securing a plastic finish panel to a metallic substrate, the substrate having a mounting aperture extending perpendicularly from an external face thereof, the fastening assembly comprising:

a plastic insert member comprising an inner, generally rectangular plug portion defining a longitudinal axis, the plug portion received along said longitudinal axis in snap-fit relationship in said substrate mounting aperture;

a metallic nut member carried in fixed relationship along said insert longitudinal axis with respect to said insert;

means for permitting a predetermined amount of movement of said nut in only two directions perpendicular to said insert longitudinal axis; and a threaded fastener received in said nut and operatively engageable with said panel to attach said panel to said substrate.

2. A fastening assembly as defined in claim 1, wherein said insert further comprises a generally rectangular outer nut mounting portion having an inner annular surface abuttingly engaging said substrate external surface upon insertion of said plug portion into snap-fit retention in said substrate mounting aperture, and outer surfaces for receiving said nut.

3. A fastening assembly as defined in claim 2, wherein said nut is received in snap-fit relationship on said insert nut mounting portion and includes means for permitting sliding movement therebetween only in two directions perpendicular to said insert longitudinal axis.

4. A fastening assembly as defined in claim 1, wherein said nut is mounted for sliding movement with respect to said insert member in said two directions.

5. A fastening assembly as defined in claim 4, wherein said nut is received in snap-fit relationship on said insert member.

6. A fastening assembly as defined in claim 6, wherein said nut is received in snap-fit relationship on said insert member nut mounting portion.

7. A fastening assembly as defined in claim 6, and further comprising means defining at least one slide surface on said insert nut mounting portion and means defining at least one slide surface on said nut complementary with said insert nut mounting portion slide portions for sliding engagement therebetween.

8. A fastening assembly as defined in claim 7, and further comprising at least one guide slot formed in said nut and at least one guide lug formed on said insert nut mounting portion and received in said at least one guide slot in snap-fit relationship and permitting relative sliding movement therebetween.

9. A fastening assembly for securing a plastic finish panel to a metallic substrate, the substrate having amounting aperture extending perpendicularly from an external face thereof, the fastening assembly comprising:

a generally C-shaped threaded fastener including a base portion having threads formed therethrough and a pair of laterally spaced side portions projecting perpendicularly from said base portion and extending longitudinally of the base portion, the nut further comprising an elongated guide slot formed through each of said slide portions; and an insert member having:

a generally box-like plug portion received in snap-fit relationship in said substrate mounting aperture, an enlarged nut mounting portion formed of generally rectangular cross-section at one end of said plug portion and integrally formed therewith, the nut mounting portion being of larger cross section than said plug portion to define a generally T-shaped stepped configuration for said insert member;

means defining longitudinally extending slide surfaces on said nut mounting portion for receiving said nut for sliding engagement therebetween;

means operatively engaged between said nut slot and said insert nut mounting portion for both limiting relative movement in two directions between said nut and said insert and for effecting snap-fit engagement between said nut and said insert; and a threaded fastener received in said nut and operatively engageable with said panel to attach said panel to said substrate.

10. A fastening assembly as defined in claim 9, wherein said insert plug portion includes a plurality of barbs projecting outwardly from the periphery for effecting said snap-fit retention in said substrate aperture.

11. A fastening assembly as defined in claim 9, wherein said insert member is fabricated from plastic and said nut member is fabricated from metal.

12. A fastening assembly as defined in claim 9, wherein said means for limiting and engaging comprises at least one lug formed with said insert member nut mounting portion and projecting through said nut guide slot.

13. A fastening assembly as defined in claim 10, wherein said means for limiting and engaging comprises at least one lug formed with said insert member nut mounting portion and projecting through said nut guide slot.

14. A fastening assembly as defined in claim 11, wherein said means for limiting and engaging comprises at least one lug formed with said insert member nut mounting portion and projecting through said nut guide slot.

15. A fastening assembly for securing a plastic finish panel to a metallic substrate, the substrate having a mounting aperture extending perpendicularly from an external face thereof, the fastening assembly comprising:

a plastic insert member defining a longitudinal axis received along said longitudinal axis in snap-fit relationship in said substrate mounting aperture;

a metallic nut member carried in fixed relationship along said insert longitudinal axis with respect to said insert, said nut being received in snap-fit relationship on said insert and includes means for permitting sliding movement therebetween only in two directions perpendicular to said insert longitudinal axis;

means for permitting a predetermined amount of movement of said nut in only two directions perpendicular to said insert longitudinal axis; and a threaded fastener received in said nut and operatively engageable with said panel to attach said panel to said substrate.

* * * * *